US009769591B2

(12) United States Patent
Nguyen et al.

(10) Patent No.: US 9,769,591 B2
(45) Date of Patent: Sep. 19, 2017

(54) METHOD AND SYSTEM FOR MACHINE TYPE COMMUNICATION

(71) Applicant: NEC Corporation, Tokyo (JP)

(72) Inventors: Phong Nguyen, Victoria (AU); Quang Nguyen, Victoria (AU)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/774,368

(22) PCT Filed: Jan. 15, 2015

(86) PCT No.: PCT/JP2015/051587
§ 371 (c)(1),
(2) Date: Sep. 10, 2015

(87) PCT Pub. No.: WO2015/108204
PCT Pub. Date: Jul. 23, 2015

(65) Prior Publication Data
US 2016/0345117 A1 Nov. 24, 2016

(30) Foreign Application Priority Data

Jan. 17, 2014 (AU) .............................. 2014900141

(51) Int. Cl.
*H04J 3/00* (2006.01)
*H04W 4/00* (2009.01)
(Continued)

(52) U.S. Cl.
CPC .......... *H04W 4/005* (2013.01); *H04L 5/0053* (2013.01); *H04W 72/042* (2013.01); *H04W 72/048* (2013.01)

(58) Field of Classification Search
None
See application file for complete search history.

(56) References Cited

U.S. PATENT DOCUMENTS

2013/0094457 A1 4/2013 Seo et al.
2013/0121317 A1 5/2013 Lee et al.
(Continued)

OTHER PUBLICATIONS

International Search Report corresponding to PCT/JP2015/051587, dated Jul. 9, 2015 (5 pages).
(Continued)

*Primary Examiner* — Gerald Smarth
(74) *Attorney, Agent, or Firm* — Wilmer Cutler Pickering Hale and Dorr LLP

(57) ABSTRACT

There are provided a method for use in an advanced wireless communication network, and a system (20) therefor. In these method and system (20), a base station (300) provides, to a radio device (100), a first control message on a first channel. The first control message indicates: a presence of a second control message on a second channel; and a coverage enhancement configuration of the second control message. The base station (300) also provides, to the radio device (100), the second control message on the second channel according to the coverage enhancement configuration. The first control message enables the radio device (100) to determine the presence of the second control message in order to be able to selectively process messages on the second channel.

23 Claims, 12 Drawing Sheets

(51) Int. Cl.
 *H04L 5/00* (2006.01)
 *H04W 72/04* (2009.01)

(56) References Cited

U.S. PATENT DOCUMENTS

| | | | | |
|---|---|---|---|---|
| 2014/0044056 A1* | 2/2014 | Chen | ...................... | H04W 72/04 370/329 |
| 2014/0098761 A1* | 4/2014 | Lee | ...................... | H04W 74/006 370/329 |
| 2014/0153515 A1* | 6/2014 | Chun | ...................... | H04L 5/0007 370/329 |
| 2014/0301307 A1* | 10/2014 | Lee | ....................... | H04L 5/0055 370/329 |
| 2015/0296518 A1* | 10/2015 | Yi | ............................ | H04L 1/08 370/336 |

OTHER PUBLICATIONS

Written Opinion corresponding to PCT/JP2015/051587, dated Jul. 9, 2015 (7 pages).
3GPP TSG RAN WG1 Meeting #75, R1-133594, Panasonic, "(E)PDCCH Coverage Enhancement for MTC," San Francisco, USA, Nov. 11-15, 2013, pp. 1-3.
3GPP TSG-RAN WG1 #75, R1-135105, Intel Corporation, "Coverage Enhancement of DL/UL Control Channels for Low Cost MTC," San Francisco, USA, Nov. 11-15, 2013, pp. 1-10.
3GPP TSG RAN WG1 Meeting #75, R1-135360, ZTE, "Discussion on Control Channel Coverage Improvement," San Francisco, USA, Nov. 11-15, 2013, (6 pages).
3GPP TS 25.212 V7.1.0, Technical Specification Group Radio Access Network, Multiplexing and Channel Coding (FDD) (Release 7) (Jun. 2006) (84 pages).
3GPP TS 36.212 V11.3.0, Technical Specification Group Radio Access Network, Evolved Universal Terrestrial Radio Access (E-UTRA), Multiplexing and Channel Coding (Release 11) (Jun. 2013) (84 pages).
3GPP TS 36.213 V11.3.0, Technical Specification Group Radio Access Network, Evolved Universal Terrestrial Radio Access (E-UTRA), Physical Layer Procedures (Release 11) (Jun. 2013) (176 pages).
3GPP TS 36.211 V11.3.0, Technical Specification Group Radio Access Network, Evolved Universal Terrestrial Radio Access (E-UTRA), Physical Channels and Modulation (Release 11) (Jun. 2013) (108 pages).
3GPP TS 36.101 V12.1.0, Technical Specification Group Radio Access Network, Evolved Universal Terrestrial Radio Access (E-UTRA), User Equipment (UE) Radio Transmission and Reception (Release 12) (Sep. 2013) (470 pages).

* cited by examiner

METHOD AND SYSTEM FOR MACHINE TYPE COMMUNICATION

CROSS-REFERENCE TO RELATED APPLICATIONS

This application is a national stage application of International Application No. PCT/JP2015/051587 entitled "Method and System for Machine Type Communication," filed on Jan. 15, 2015, which claims priority to Australian Patent Application No. 2014900141, filed on Jan. 17, 2014, the disclosures of each which are hereby incorporated by reference in their entirety.

TECHNICAL FIELD

The present invention relates to control signalling in advanced wireless communication networks. In particular, although not exclusively, the invention relates to enhancing cell coverage for Machine Type Communication (MTC) devices in an advanced wireless communication network.

ABBREVIATIONS

The following abbreviations are used herein:

| | |
|---|---|
| 3GPP | third generation partnership project |
| ACK | Acknowledgement |
| BOM | Bill of material |
| BW | Bandwidth |
| CAT | Category (e.g. CAT1: UE category #1) |
| CCI | Control Channel Indicator |
| CSS | Common search space |
| DCI | Downlink Control Information |
| eNB | Evolved Node B |
| EPA | Extended Pedestrian A (defined in 3GPP TS 36.101 v12.1.0) |
| FFT | Fast Fourier Transform |
| GPRS | General Packet Radio Service |
| GSM | Global System for Mobile communications |
| IP | Internet Protocol |
| LTE | Long term evolution |
| MTC | Machine Type Communication |
| (E)PDCCH | (enhanced) physical downlink control channel |
| PCell | primary component carrier |
| PDCCH | physical downlink control channel |
| PDCICH | physical downlink control indicator channel |
| QPSK | Quadrature Phase Shift Keying |
| REG | Resource Element Group |
| Rel. | Release (e.g. LTE Rel. 11 means LTE Release 11) |
| RF | Radio Frequency |
| RNTI | Radio Network Temporary Identifier |
| RRC | radio resource control |
| SNR | Signal to Noise ratio |
| UE | User Equipment (device) |
| USS | UE (device) specific search space |
| UMTS | Universal Mobile Telecommunications System |

BACKGROUND ART

Wireless voice and data communications systems generally comprise multiple-access systems which are capable of supporting communication with a plurality of devices by sharing available system resources (e.g. bandwidth and transmit power). Examples of Radio Access Technologies (RATs) that share available system resources among devices include code division multiple access (CDMA) systems, time division multiple access (TDMA) systems, frequency division multiple access (FDMA) systems, GSM/GPRS systems, 3GPP Long Term Evolution (LTE) systems, and orthogonal frequency division multiple access (OFDMA) systems.

Many of these RATs currently coexist in wireless communications systems, thus requiring ongoing support for each of the multiple RATs. Newer and more flexible technologies, such as LTE based technologies, are able to support a wide range of legacy applications. While it is generally desirable to reduce the cost of overall network maintenance by minimising the number of supported RATs within a network, network operators must generally continue to implement legacy RATs to provide services to sufficiently wide range of devices.

A market experiencing ongoing expansion is that of machine to machine communications, referred to as Machine-to-Machine (M2M) in ETSI (European Telecommunications Standards Institute) and Machine-Type Communications (MTC) in 3GPP. MTC involves the automated communication between mechanical or electronic devices, enabling networked machines to exchange information and perform actions without the manual assistance of humans. MTC applications include smart metering, commercial fleet tracking, and so forth.

Many MTC devices of the prior art are currently targeted at low-end (e.g. low average revenue per user, low data rate) applications that can be handled adequately by GSM/GPRS networks. Owing to the low cost of these MTC devices and the good coverage of GSM/GPRS, there has been very little motivation for MTC device suppliers to use modules that support a full LTE radio interface. Therefore, as more MTC devices of this type are deployed in wireless communication networks, there becomes an increased reliance on the existing GSM/GPRS networks.

Thus, this increased reliance on GSM/GPRS networks will cost network operators not only in terms of maintaining multiple RATs, but it will also prevent operators efficiently utilising their spectrum given the suboptimal spectrum efficiency of GSM/GPRS.

Accordingly, there is a need for an improved method and system for machine type communication.

It will be clearly understood that, if a prior art publication is referred to herein, this reference does not constitute an admission that the publication forms part of the common general knowledge in the art in Australia or in any other country.

SUMMARY OF INVENTION

The present invention is directed to control signalling in advanced wireless communication networks, which may at least partially overcome at least one of the abovementioned disadvantages or provide the consumer with a useful or commercial choice.

With the foregoing in view, the present invention in one form, resides broadly in a method for use in an advanced wireless communication network. This method includes providing, to a radio device, a first control message on a first channel. The first control message indicates: a presence of a second control message on a second channel; and a coverage enhancement configuration of the second control message. The method also includes providing, to the radio device, the second control message on the second channel according to the coverage enhancement configuration.

According to some embodiments, the first control message enables the radio device to determine a presence of a second control message in order to be able to selectively process messages on the second channel.

According to certain embodiments, the coverage enhancement configuration defines a number of repetitions of the second control message in a repetition region.

According to some embodiments, the first message is provided on a physical downlink control indicator channel. The second message can be provided on a physical downlink control channel.

According to certain embodiments, the radio device comprises a Machine-Type Communication (MTC) device.

According to certain embodiments, the first message is provided multiplexed with other control messages in a control region, for blind detection by the radio device. In particular, the first channel can be processed with an aggregation level of 8 control channel elements (CCEs), multiplexed with other physical downlink control channels for other radio devices, and mapped within a control region for blind detection the radio device.

According to certain embodiments, the first control message includes a 2-bit control channel indicator to indicate 2, 3 or 4 repetition levels of the associated second control message. The repetition levels can correspond to different levels of coverage enhancement at the radio device.

According to certain embodiments, the method further comprises encoding the 2-bit control channel indicator to produce a 72-bit codeword. The method can further comprise masking the 72-bit codeword with a 72-bit device specific mask, and rate-matching the masked 72-bit codeword to generate 576 physical downlink control indicator channel bits. For example, the 72-bit device specific mask is generating by encoding a 16-bit RNTI with 1/3 convolutional coding. The 16-bit RNTI can comprise one of: a SI-RNTI, a P-RNTI, an RA-RNTI, a C-RNTI or an MTC-RNTI.

According to certain embodiments, the 2-bit control channel indicator is encoded using the following coding table:

| MTC-CCI | MTC-CCI code word $<b_0, b_1, \ldots, b_{71}>$ |
|---|---|
| 0 | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |

According to certain embodiments, the method further comprises providing, to the radio device, repetitions of the first message in a plurality of distinguishable control regions. The number of repetitions of the first message can be at least partly predefined. The plurality of distinguishable control regions can comprise control regions of consecutive subframes within a radio frame immediately preceding the radio frame having the second control message. The number of repetitions of the first message can defined according to a control search space. The number of repetitions of the first message can be 5 for a MTC-PDCICH in a common search space.

In another form, the present invention resides broadly in a base station for advanced wireless communication. This base station includes: a transmitter; a processor coupled to the transmitter; a memory coupled to the processor. The memory includes instruction code executable by the processor for: providing, by the transmitter to a radio device, a first control message on a first channel, the first control message indicating: a presence of a second control message on a second channel; and a coverage enhancement configuration of the second control message; and providing, by the transmitter to the radio device, the second control message on the second channel according to the coverage enhancement configuration.

In yet another form, the present invention resides broadly in a system for advanced wireless communication. This system includes: a radio device; a base station. The base station includes: a transmitter; a processor coupled to the transmitter; a memory coupled to the processor. The memory includes instruction code executable by the processor for: providing, by the transmitter to a radio device, a first control message on a first channel, the first control message indicating: a presence of a second control message on a second channel; and a coverage enhancement configuration of the second control message; and providing, by the transmitter to the radio device, the second control message on the second channel according to the coverage enhancement configuration. The first control message enables the radio device to determine a presence of a second control message in order to be able to selectively process messages on the second channel.

Certain embodiments of the present invention define a new control channel indicator in the form of an MTC-CCI, referred generally to as a first control message, for low cost MTC devices requiring coverage enhancement. The MTC-CCI can be encoded and masked with an encoded RNTI (Radio Network Temporary Identity) for detection of the intended MTC-CCI, to indicate that a second control message is transmitted on the MTC-PDCCH and provides an indication of number of repetitions of the MTC-PDCCH transmission.

According to certain embodiments, a coding method for MTC-CCI is defined that provides an optimal (or near optimal) rate of successful detection (i.e. low probability of miss detection) and also low probability of false detection, with small number of repetitions (e.g. 5 times) for MTC-CCI transmission. This in turn can save resources and reduce power consumption.

According to a worst case scenario in which a base station transmits a first control message comprising a control channel indicator to an MTC device and maximum number of repetition is required for achieving target coverage enhancement, certain embodiments of the present invention introduce a control signalling overhead of ~6.58% in the form of a first control message transmitted on an MTC-PDCICH. However, such embodiments achieve several advantages in performance, as discussed below.

In particular, when successfully detecting a first control message, an MTC device can store data and process the MTC-PDCCH effectively and correctly corresponding to the informed number of repetitions of the MTC-PDCCH transmission needed for a required coverage enhancement. This enables a base station option to configure different repetition levels for MTC devices requiring different levels of coverage enhancement, which in turn results in better resource/spectrum utilisation at a base station, as well as signal processing power conservation at a MTC device.

Furthermore, when an MTC device does not detect any first control message, it knows that there is no MTC-PDCCH transmitted for it or there is a MTC-PDCCH transmitted for it but will not be decodable due to bad channel/environment condition. In either such case, it does not need to monitor and decode any MTC-PDCCH, and as such significant reductions in power consumption can be achieved.

Accordingly, while first control message may have a small overhead, significant reductions in processing MTC-PDCCHs can be achieved.

Certain embodiments of the present invention provides an effective and reliable method for transmitting dynamic control signalling. In particular, certain embodiments enable a radio device to significantly reduce power consumption as control channels relating to the particular radio device need to be decoded. The present invention can be used together with low cost MTC devices requiring enhanced coverage.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Description of Embodiments which provides sufficient information for those skilled in the art to perform the invention. The Description of Embodiments is not to be regarded as limiting the scope of the preceding Summary of the Invention in any way. The Description of Embodiments will make reference to a number of drawings as follows.

DESCRIPTION OF EMBODIMENTS

Figure 1:
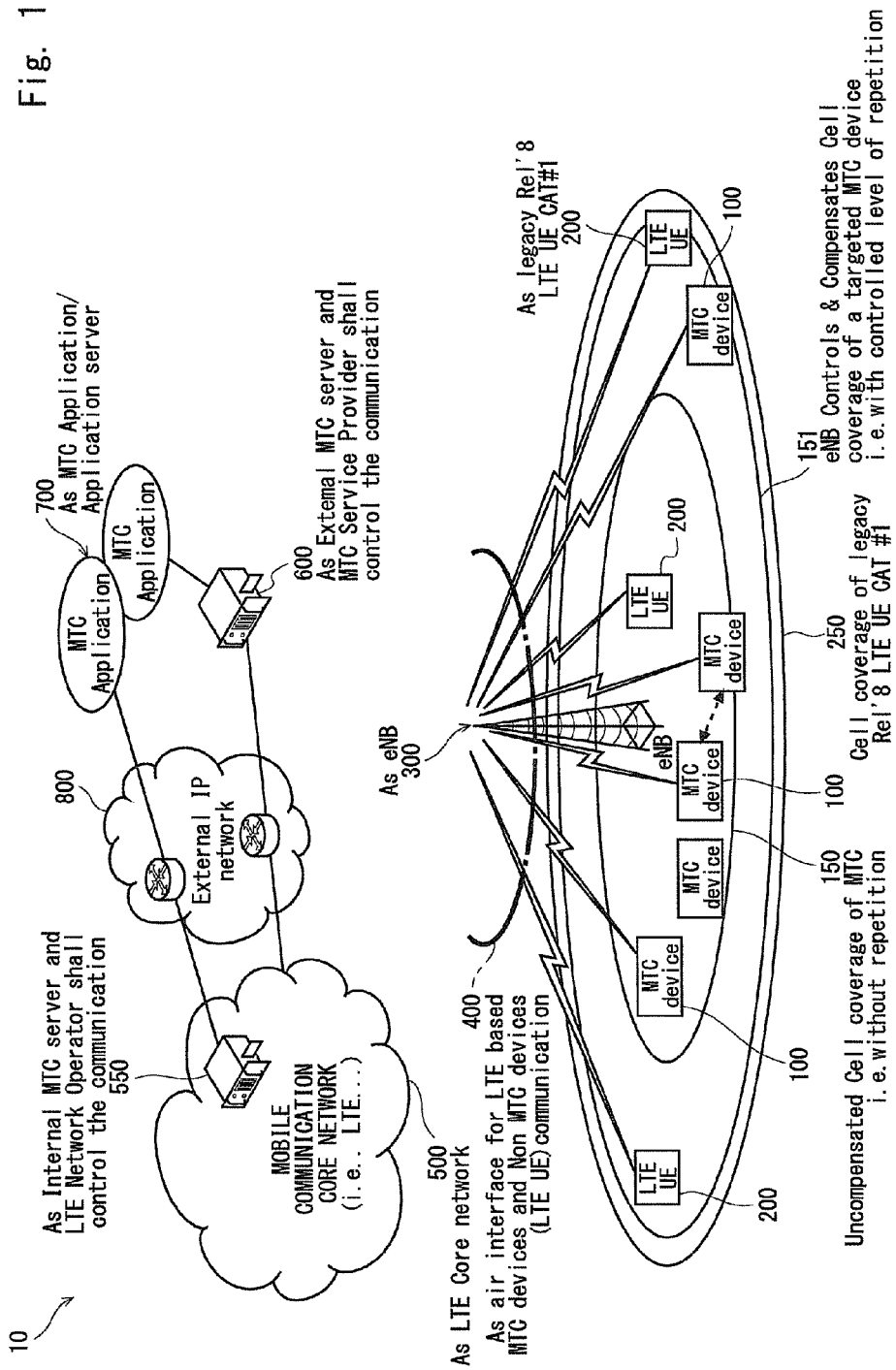
FIG. 1 is a schematic diagram illustrating an exemplary communication network, according to an embodiment of the present invention.

FIG. 1 is a schematic diagram illustrating an exemplary communication network 10, according to an embodiment of the present invention.

The communication network 10 comprises a mobile communication network including a plurality of MTC devices 100 and a plurality of legacy LTE UEs 200. The MTC devices 100 can be defined according to 3GPP standards, and comprise devices engaging in data communications involving one or more entities which do not necessarily need human interaction. As such, the MTC devices 100 typically generate a specific type of wireless communication network traffic. In contrast, the plurality of legacy LTE UEs 200 can include wireless devices such as mobile phones, smart phones, laptop computers, and so forth, for voice and data communication by human users.

The network 10 includes an LTE core network 500 which connects to an external IP network 800. The external IP network 800 provides connectivity between the LTE core network 500 and one or more external MTC servers 600. Furthermore, the external IP network 800 provides connectivity between an internal MTC server 550 that is internal to the LTE core network 500 and one or more MTC application servers 700. The skilled addressee will, however, readily appreciate that the network 10 does not require both the internal MTC server 550 and the external MTC server 600, but instead can function with one of the internal MTC server 550 and the external MTC server 600.

MTC servers, such as the internal MTC server 550 or the external MTC server 600, provide MTC communication service to the MTC devices 100. Furthermore, the MTC application server 700 is responsible for providing application services to the MTC devices 100.

The network 10 further comprises multiple enhanced Node B (eNB) base stations 300 (of which one is illustrated) which interconnect with the LTE core network 500 to provide wireless connectivity and access to the LTE UEs 200 and the MTC devices 100.

A legacy LTE UE 200, such as a Rel'8 LTE UE CAT#1 having dual received RF chains as default, can have a broad cell coverage 250, as illustrated in FIG. 1.

The MTC devices 100 can comprise low cost LTE devices including BW reduction, peak rate reduction and a single received RF chain as well as a method of repetition for coverage enhancement, advantageously resulting in a reduced BOM cost. Furthermore, the MTC devices 100 can be deployed in a very low SNR region such as in the basement of a building. As the result of having only a single received RF chain, without repetition the MTC devices 100 can have a reduced cell coverage 150, as illustrated in FIG. 1.

Embodiments of the present invention provide methods for downlink control signalling through an air interface 400 of the eNB base stations 300 in such a way that a low cost MTC device 100 can obtain dynamically controlled cell coverage, such as compensated cell coverage 151, while conserving processing power, as described in further detail below.

Figure 2:
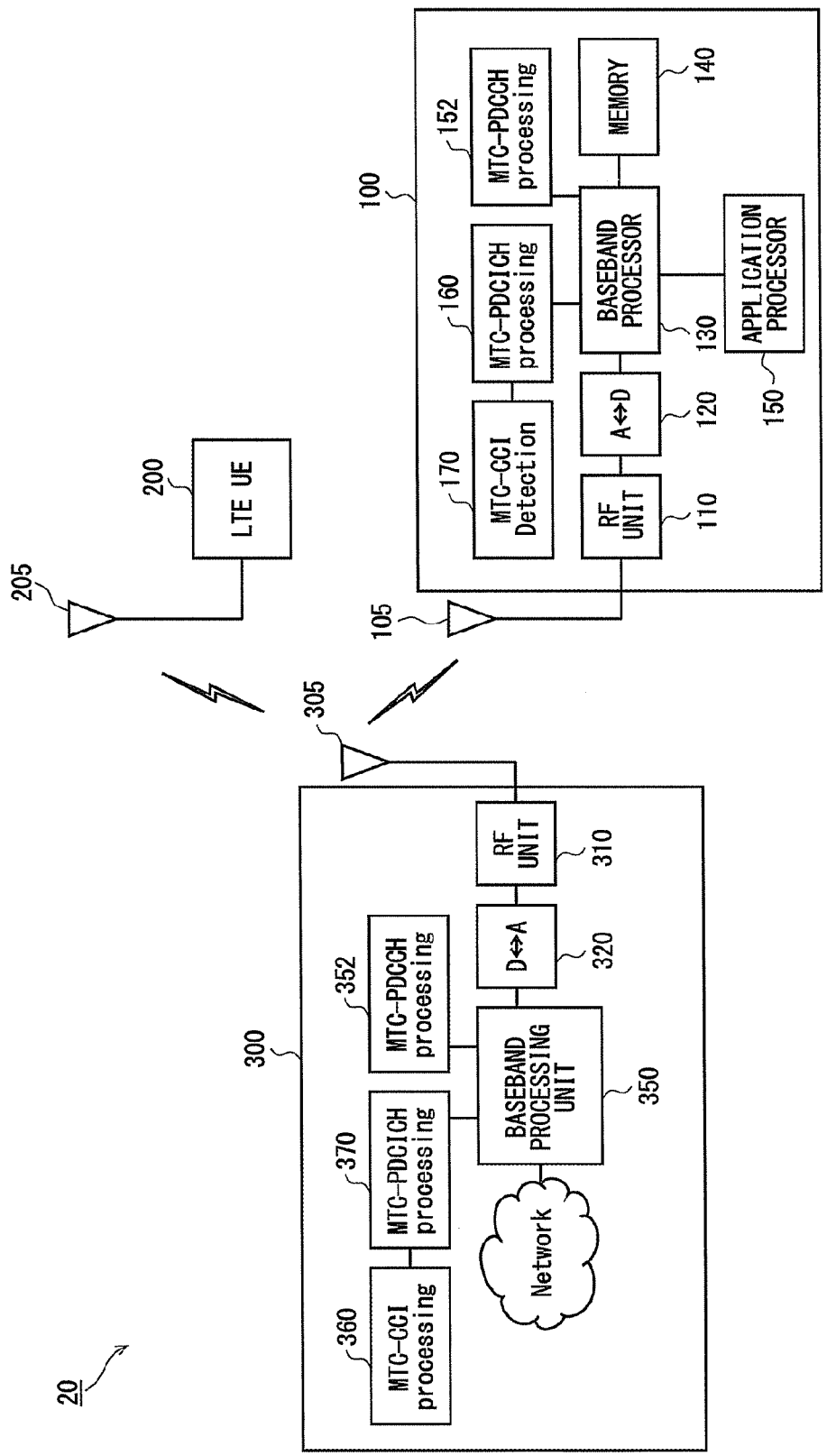
FIG. 2 illustrates a simplified block diagram of a communication system including an LTE based MTC device and an LTE base station, according to an embodiment of the present invention.

FIG. 2 illustrates a simplified block diagram of a communication system 20 including an LTE based MTC device 100, an LTE device 200 and an LTE base station 300, according to an embodiment of the present invention.

The LTE base station 300 comprises a baseband processing unit 350 for baseband signal processing, a digital to analogue converter 320, a radio frequency (RF) unit 310 having transmitter and receiver, an antenna 305 for transmitting and receiving radio frequency signal to and from the LTE UE 200 and the MTC device 100, a MTC-PDCCH processing unit 352 for DCI and MTC physical downlink control channel processing including repetition for achieving desired coverage enhancement, a MTC-CCI processing unit 360 and an associated MTC-PDCICH processing unit 370. The various modules of the LTE base station 300 are functional modules and may be implemented by software, firmware, hardware, or any combination thereof.

The LTE based MTC device 100 comprises an application processor 150, a baseband processor 130 for baseband signal processing, a digital to analogue converter 120, a Radio frequency (RF) unit 110 having transmitter and receiver, an antenna 105 for transmitting and receiving radio frequency signal to and from the LTE base station 300, a MTC-PDCCH processing unit 152 for blind decoding of physical downlink control channel with repetition, a MTC-CCI processing unit 170 and an associated MTC-PDCICH processing unit 160. The various modules of the LTE based MTC device 100 are functional modules and may be implemented by software, firmware, hardware, or any combination thereof. The functional modules, when being executed by the baseband processor 130, interwork with each other to allow the MTC device 100 in a particular repetition region (either predefined or being configured by RRC-signalling) to detect the control information indicating the existence of control channel(s) allocated to itself and an associated number of repetitions.

According to certain embodiments, the present invention resides in method for transmission and reception of MTC control signalling, so called MCT-CCI, and the associated MTC-CCI processing.

The MTC-CCI comprises 2 bits of information indicating a level of repetition and 16 bits RNTI. In particular, the MTC-CCI comprises 2-bits information representing value of {0, 1, 2, 3} to indicate up to 4 different levels of repetitions for an MTC PDCCH transmission to achieve up to 4 different quantized levels of coverage enhancement. The levels of coverage enhancement can, for example, correspond to 3.4 dB, 6.8 dB, 10.2 dB and 13.6 dB. The skilled addressee will readily appreciate that the exact number of repetitions required to achieve the of coverage enhancement levels varies depending on various parameters of the system. The 16-bit RNTI is for assisting an MTC device in MTC-CCI detection. Depending on MTC device states and modes, the RNTI may be SI-RNTI, P-RNTI, RA-RNTI, temporary C-RNTI, or C-RNTI, for example. In particular, for transmission/reception of system information block (SIB), SI-RNTI can be used and for transmission/reception of paging information, P-RNTI can be used.

The MTC-CCI is transmitted by a base station to a MTC device on a newly proposed physical channel, so called MTC physical downlink control indicator channel (MTC-PDCICH).

Figure 3:
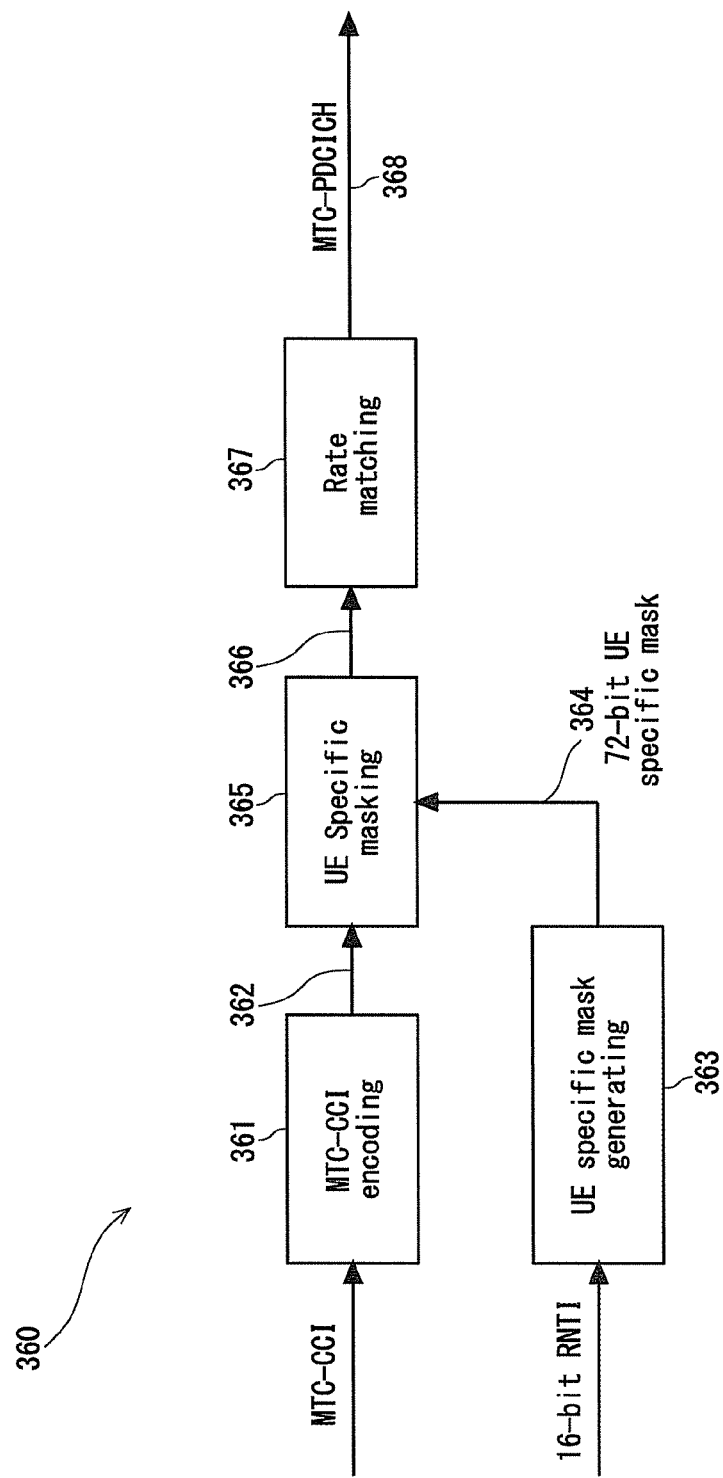
FIG. 3 illustrates a block diagram of an MTC-CCI processing module, according to an embodiment of the present invention.

FIG. 3 illustrates a block diagram of an MTC-CCI processing module 360, according to an embodiment of the present invention. The MTC-CCI processing module 360 can form part of a base station supporting MTC, and takes 2 bits MTC-CCI and 16 bits RNTI as input to produce an MTC-PDCICH.

The processing module 360 includes an MTC-CCI encoding module 361, a device specific mask generating module 363, a device specific masking module 365 and a rate matching module 367.

The MTC-CCI encoding module 361 takes a 2-bit MTC-CCI as input to generate a 72-bit MTC-CCI codeword 362. The MTC-CCI is coded according to Table 1 below.

TABLE 1

| MTC-CCI | MTC-CCI code words |
|---|---|
| | MTC-CCI code word (362) $<b_0, b_1, \ldots, b_{71}>$ |
| 0 | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |

The device specific mask generating module 363 takes a 16-bit RNTI as input to generate 72-bit device specific mask 364 by encoding the 16-bit RNTI using a rate 1/3 convolutional coding with 8 zero tail bits added to the end of the 16-bit RNTI. An example of a rate 1/3 convolutional coder that can be used is specified in Section 4.2.3.1 of 3GPP TS 25.212 v7.1.0.

The device specific masking module 365 then masks the 72-bit code word 362 with the 72-bit device specific mask 364 to generate an output of 72-bit masked MTC-CCI code word 366 using the following function:

$$z_k = x_k \oplus m_k, \ k=0,1,\ldots,71$$

Where
$\oplus$: excusive OR operation
x: 72-bit MTC-CCI code word (362)
m: 72-bit device specific mask sequence (364)
z: 72-bit masked MTC-CCI code word (366)

The rate matching module 367 performs demuxing of the 72-bit masked MTC-CCI code word (366) into three streams of 24 bits: $d_i^{(0)} = z_{3i}$, $d_i^{(1)} = z_{3i+1}$, and $d_i^{(2)} = z_{3i+2}$, i=0, 1, . . . , 23, and rate matching on the three streams using the method specified in Section 5.1.4.2 of 3GPP TS 36.212 v11.3.0 to output a sequence of MTC-PDCICH bits (368). The size E of MTC-PDCICH is dependent on the number of Control Channel Elements (CCE) allocated to a MTC-PDCICH which would be a fixed value of 8 CCEs, i.e. E=72*8=576.

Figure 4:
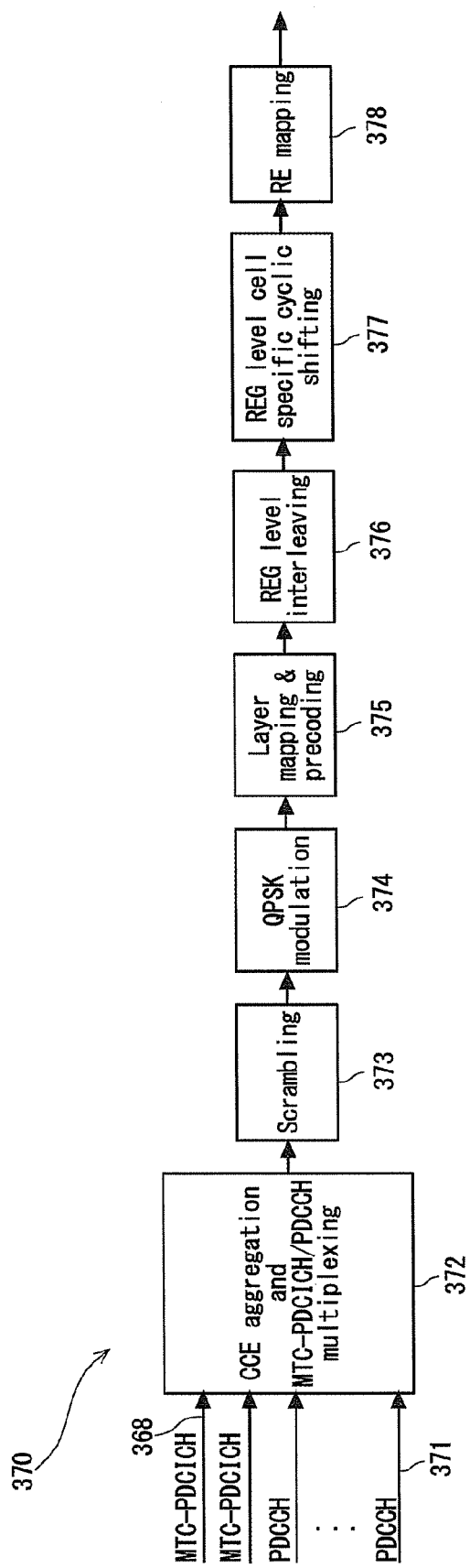
FIG. 4 illustrates a block diagram of an MTC-PDCICH processing module, according to an embodiment of the present invention.

FIG. 4 illustrates a block diagram of a MTC-PDCICH processing module 370, according to an embodiment of the present invention. The MTC-PDCICH processing module 370 can, for example, form part of a base station supporting MTC. The MTC-PDCICH processing module 370 takes MTC-PDCICHs and other legacy PDCCHs being transmitted in a subframe as inputs to produce a code composite physical control channel for mapping on the subframe control region. The MTC-PDCICH processing module 370 includes a CCE aggregation and MTC-PDCICH/PDCCH multiplexing module 372, a scrambling module 373, a QPSK modulation module 374, a layer mapping & precoding module 375, a REG (Resource Element Group) level interleaving module 376, a REG level cell specific cyclic shifting module 377, and a RE (Resource Element) mapping (378).

The CCE aggregation and MTC-PDCICH/PDCCH multiplexing module 372 performs CCE aggregation and multiplexing of MTC-PDCICHs 368 and PDCCHs 371. According to certain embodiments, the processing specified in Section 6.8.2 of 3GPP TS 36.211 v11.3.0 is used. In such case, an MTC-PDCICH is treated as a PDCCH except that during a repetition transmission period (e.g. 5 subframes) the same MTC-PDCICH is transmitted and its position index in its device specific search space or the common search space is unchanged. This both simplifies processing and enables power consumption of MTC device to be reduced.

Figure 5:
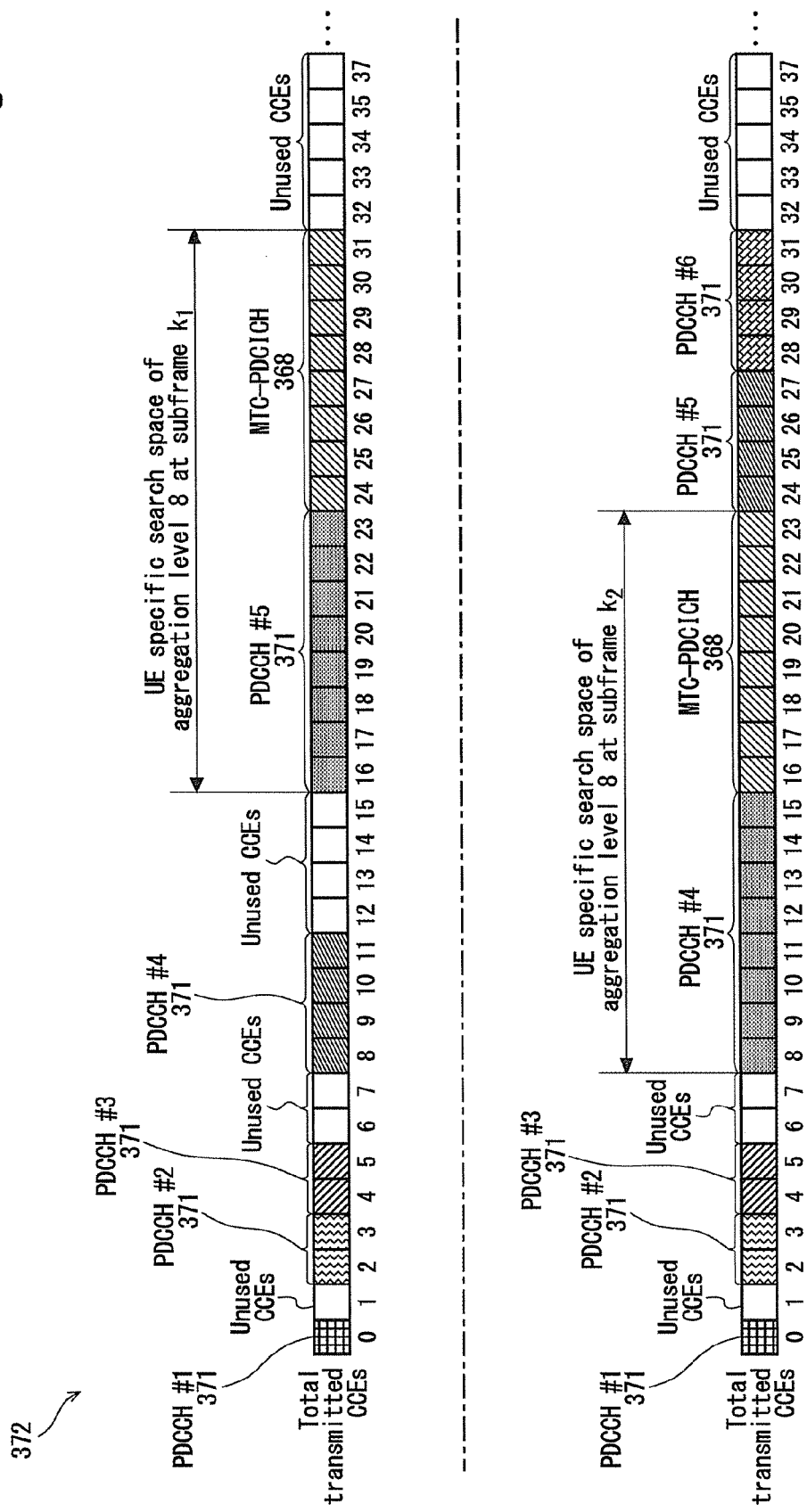
FIG. 5 illustrates an example of CCE aggregation and MTC-PDCICH/PDCCH multiplexing, according to an embodiment of the present invention.

FIG. 5 illustrates an example of CCE aggregation and MTC-PDCICH/PDCCH multiplexing, according to an embodiment of the present invention. As illustrated in FIG. 5, the location of the MTC-PDCICH in the device specific search space in the example is the same in subframes k1 and k2 during a repetition period.

The processing of other functional processing modules, i.e. the scrambling module 373, the QPSK modulation module 374, the layer mapping & precoding module 375, the REG level interleaving module 376, the REG level cell specific cyclic shifting module 377 and the RE mapping module 378, is specified in Sections 6.8.2, 6.8.3, 6.8.4 and 6.8.5 of 3GPP TS 36.211 v11.3.0.

Figure 6:
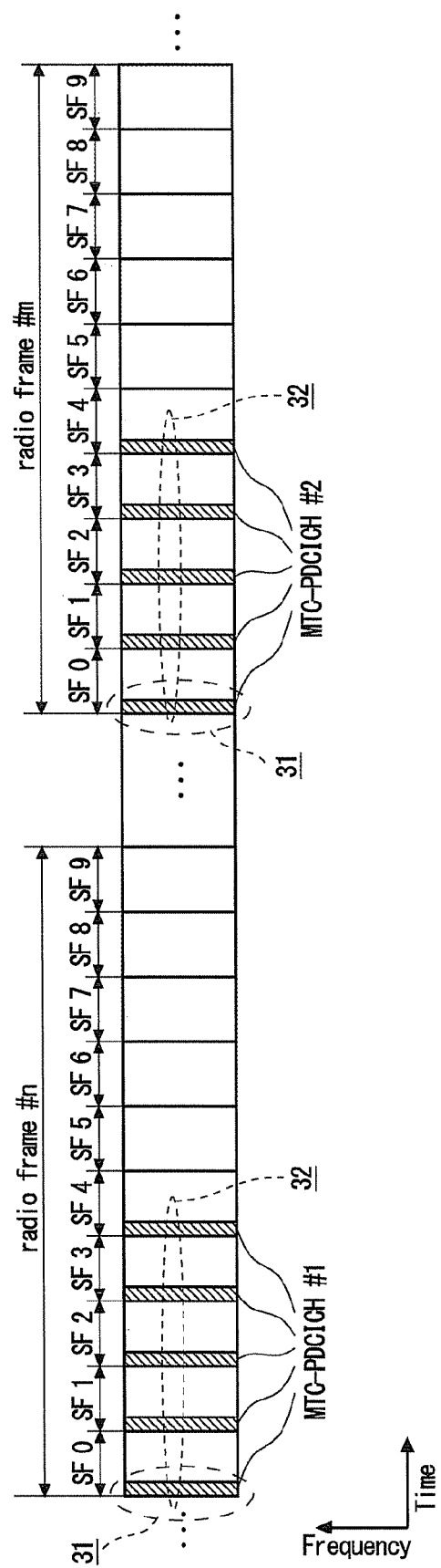
FIG. 6 illustrates an example of MTC-PDCICH repetition, according to an embodiment of the present invention.

The MTC-PDCICH is repeatedly transmitted N times in N subframes so that the energy per bit of MTC-PDCICH can be accumulated at an MTC device to meet the required coverage enhancement. N is preferably less than 10 and typically can be 5 (i.e. N=5). FIG. 6 illustrates an example of MTC-PDCICH repetition, according to an embodiment of the present invention. The repetition of respective MTC-PDCICH starts at subframe #0 in each configured or pre-defined radio frame 31, and as illustrated by repetition 32 each MTC-PDCICH is transmitted 5 times.

Figure 7:
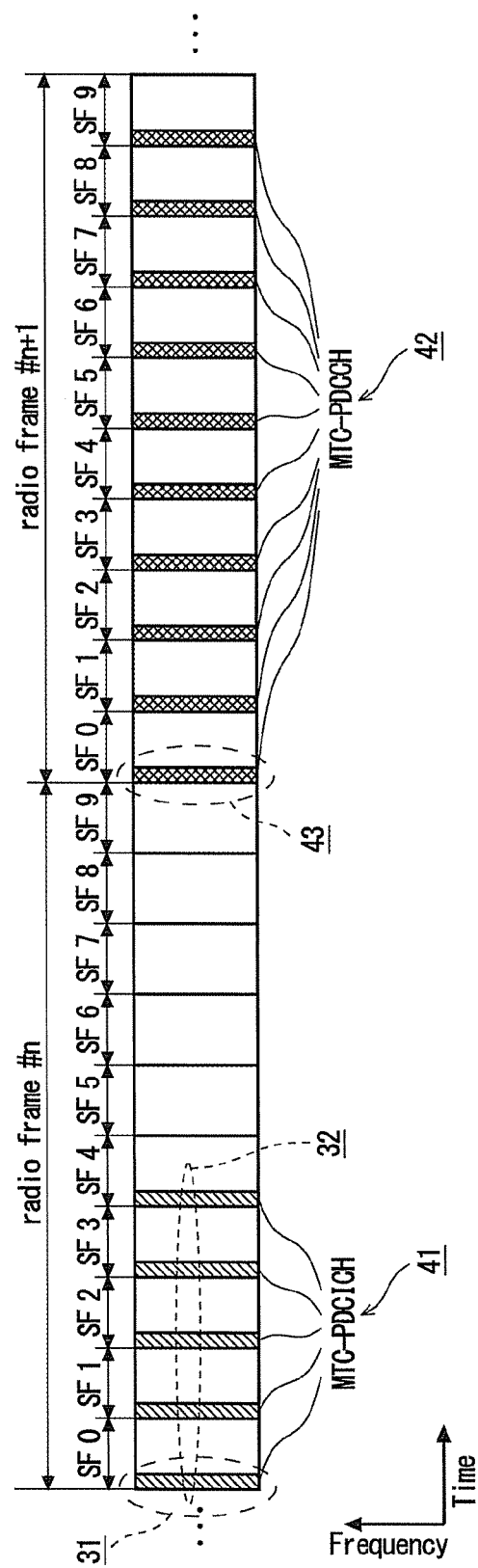
FIG. 7 illustrates an example of MTC-PDCICH and MTC-PDCCH timing, according to an embodiment of the present invention.

FIG. 7 illustrates an example of MTC-PDCICH and MTC-PDCCH timing, according to an embodiment of the present invention. The example includes an MTC-PDCICH 41 and an associated MTC-PDCCH 42. The transmission of the MTC-PDCCH 42 is started at a first subframe 43 of a radio frame that immediately follows the radio frame on which the associated MTC-PDCICH 41 was transmitted.

Figure 8:
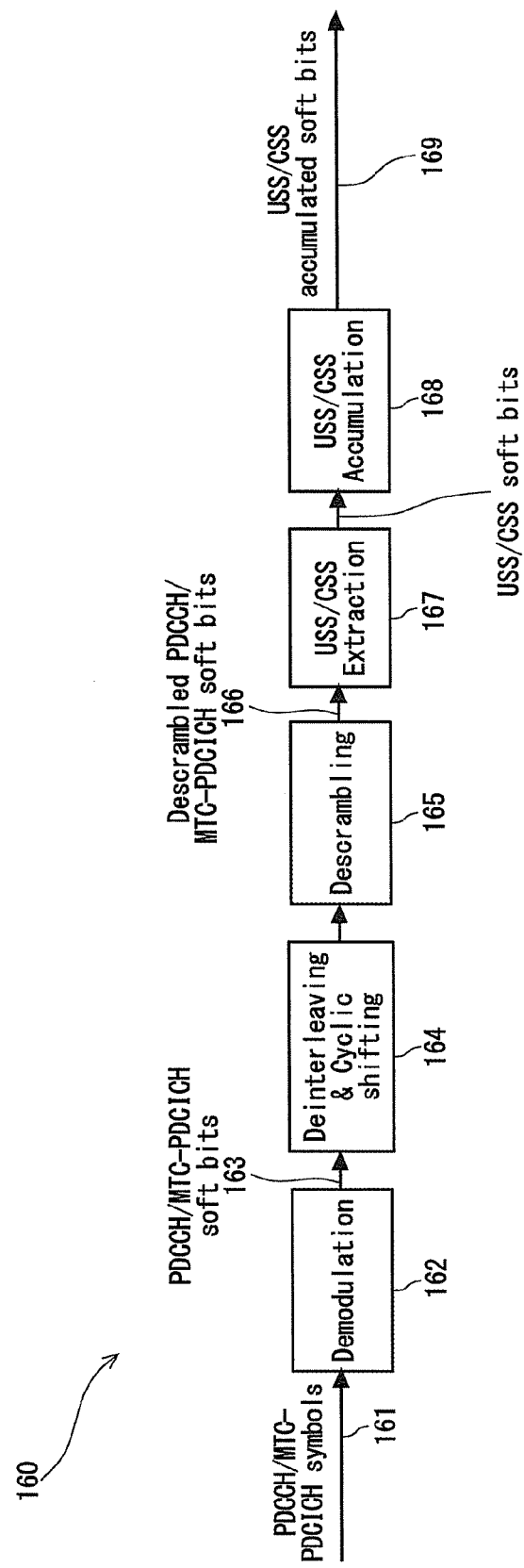
FIG. 8 illustrates an MTC-PDCICH processing module, according to an embodiment of the present invention.

FIG. 8 illustrates an MTC-PDCICH processing module 160, according to an embodiment of the present invention. The MTC-PDCICH processing module 160 can, for example, form part of an MTC device. The MTC-PDCICH processing module 160 takes PDCCH/MTC-PDCICH symbols received in the control region of a subframe as input to produce accumulated UE (device) specific search space (USS)/common search space (CSS) soft bits for further MTC-CCI processing, as discussed below. The MTC-PDCICH processing module 160 comprises a demodulation module 162, a deinterleaving and cyclic shifting module 164, a descrambling module 165, a USS/CSS extraction module 167, and a USS/CSS Accumulation module 168.

At an MTC device, such as the MTC device 100 of FIG. 1, the received time-domain OFDM symbols are converted to frequency domain by FFT, then PDCCH/MTC-PDCICH symbols 161 are extracted from the control region according to the RE mapping for PDCCH specified in Section 6.8.5 of 3GPP TS 36.211 v11.3.0.

The demodulation module 162 performs equalizing and demodulating the PDCCH/MTC-PDCICH symbols 161 to generate PDCCH/MTC-PDCICH soft bits 163. The PDCCH/MTC-PDCICH soft bits 163 are then processed by the deinterleaving and cyclic shifting module 164, which performs deinterleaving and cyclic shifting which are reverse processes of REG level interleaving 376 and REG level cell specific cyclic shifting 377 done at base station side, as discussed above.

The descrambling module 165 then performs descrambling on the PDCCH/MTC-PDCICH soft bits 163 after deinterleaving and cyclic shifting to generate descrambled PDCCH/MTC-PDCICH soft bits 166.

The USS/CSS Extraction module 167 extracts the soft bits in the device specific search space or/and common search space according to Section 9.1.1 of 3GPP TS 36.213 v11.3.0. Assuming that the aggregation level L for MTC-PDCICH is 8 and the MTC device is not configured with carrier indicator field, 1152 soft bits in the device specific search space or common search space can be extracted as follows:

Let u be the sequence of descrambled PDCCH/MTC-PDCICH soft bits (166); and s be the sequence of extracted soft bits in the USS or CSS.

For the common search space: $s(j)=u(j)$; $j=0, 1, \ldots, 1151$

For device specific search space:

$$s(72mL+72i+j)=u(72L\{(Y_k+m) \bmod \lfloor N_{CCE,k}/L \rfloor\}+72i+j)$$

where m=0, 1 is the index of a PDCCH/PDCICH candidate in USS/CSS search space i=0, 1, . . . , 7 is the index of CCE in a PDCCH/PDCICH candidate j=0, 1, . . . , 71 is the index of soft bits in a CCE L=8 is the aggregation level for MTC-PDCICH $N_{CCE,k}$ is the total number of CCEs in the control region of subframe $Y_k$ is defined by $Y_k=(A \cdot Y_k) \bmod D$ where $Y_{-1}=n_{RTNI} \neq 0$, A=39827, D=65537 and k is the subframe number within a radio frame. The RNTI value used for $n_{RTNI}$ is defined in section 7.1 in downlink and section 8 in uplink of 3GPP TS 36.213 v11.3.

The USS/CSS accumulation module 168 stores and accumulates the descrambled USS/CSS soft bits for the duration of the repetition period of the MTC-PDCICH transmission to output accumulated USS/CSS soft bits 168.

Figure 9:
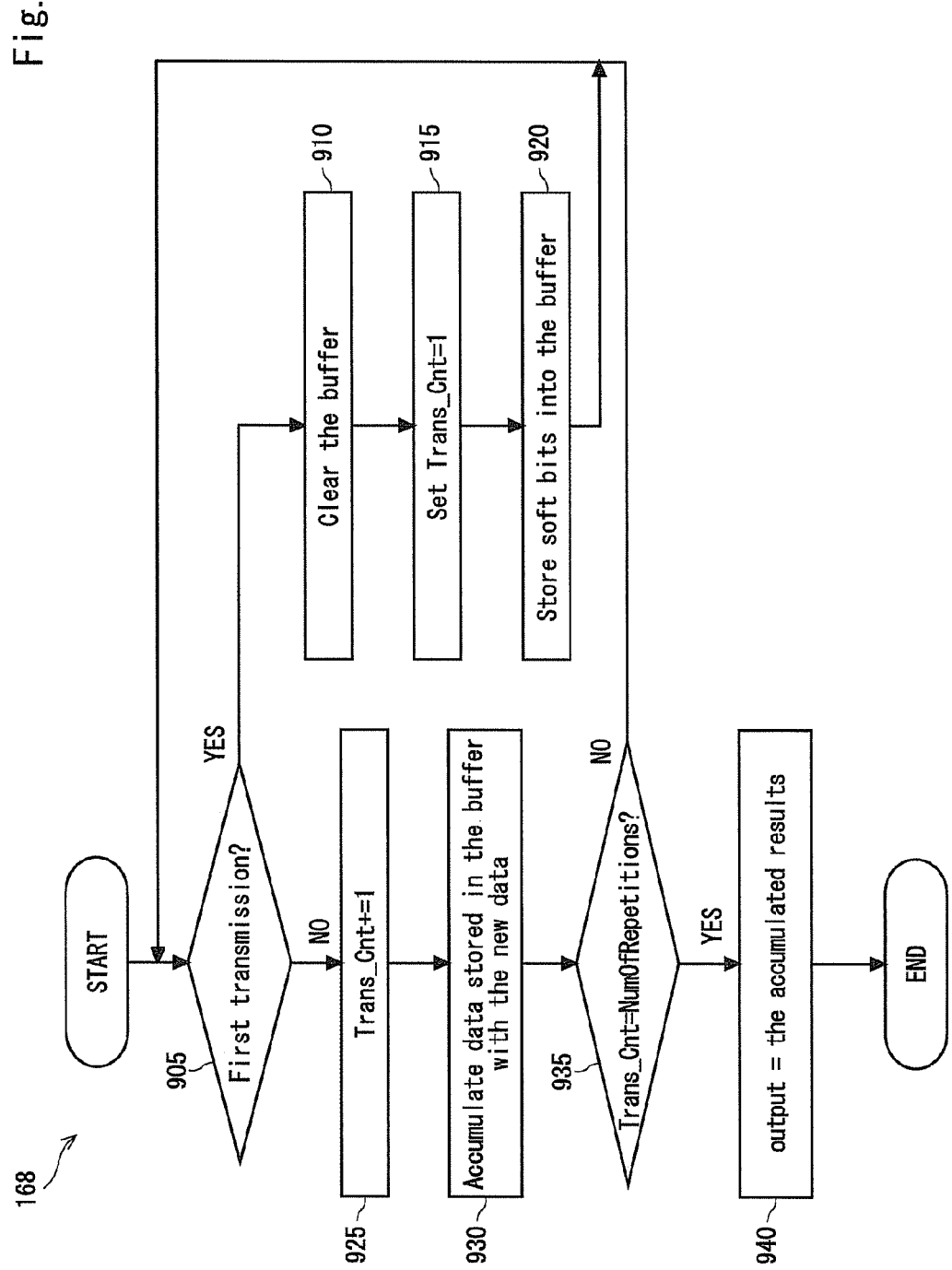
FIG. 9 illustrates a method of accumulation, for example as performed by a USS/CSS accumulation module, according to an embodiment of the present invention.

FIG. 9 illustrates a method 900 of accumulation, for example as performed by the USS/CSS accumulation module 168, according to an embodiment of the present invention.

At 905, it is determined if a received transmission is the first transmission. If so, a buffer is cleared in 910, a transmission counter (Trans_cnt) is set to 1 in 915, and soft bits of the transmission are stored in the buffer in 920, upon which further data is processed in 905. If the received transmission is not the first transmission, the transmission counter is incremented in 925, and the new data is accumulated with the existing data stored in the buffer in 930.

At 935, it is determined if the transmission counter has reached a number of transmission repetitions (NumOfRepitions). If so, the accumulated results of the buffer are set as output in 940 and the method ends. If no, further data is processed in 905.

Figure 10:
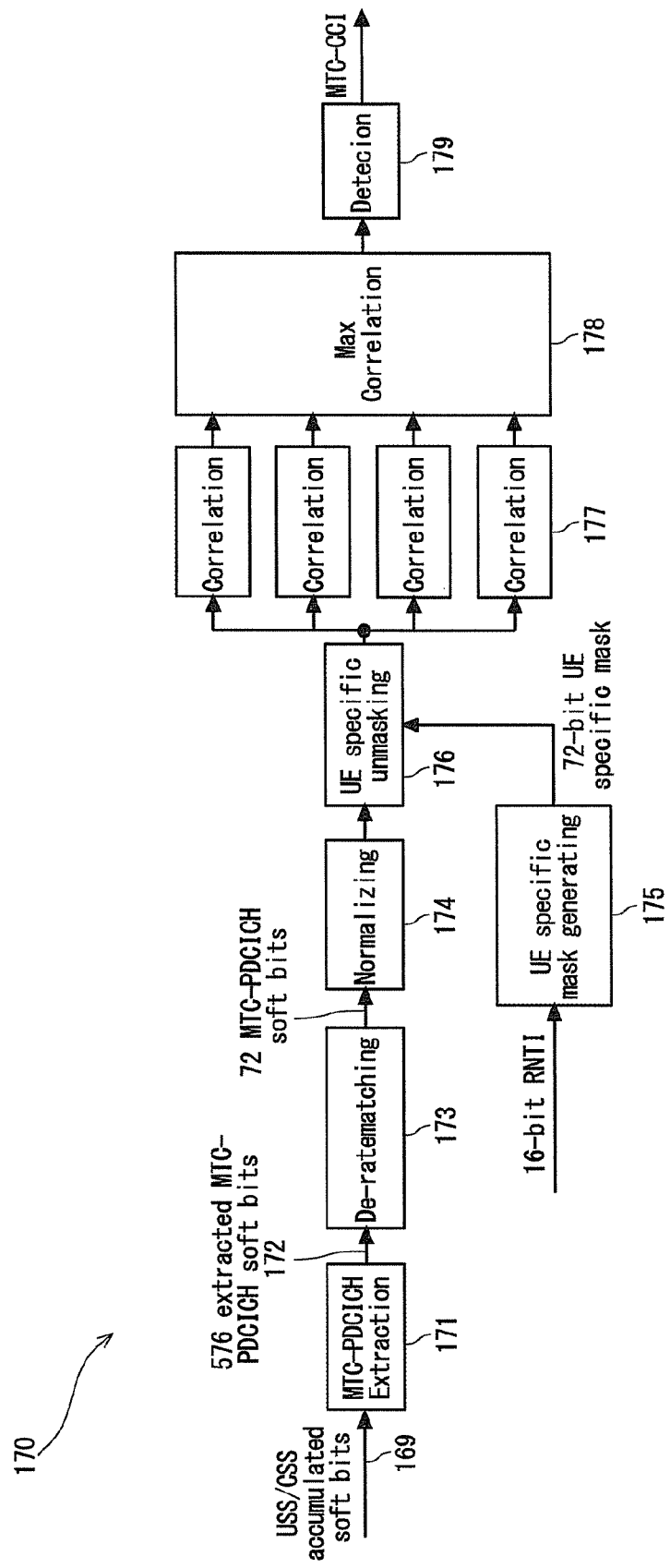
FIG. 10 illustrates an MTC-CCI detection module, according to an embodiment of the present invention.

FIG. 10 illustrates an MTC-CCI detection module 170, according to an embodiment of the present invention. The MTC-CCI detection module 170 can, for example, comprise part of an MTC device, such as the MTC device 100 of FIG. 1.

The MTC-CCI detection module 170 takes the accumulated USS/CSS soft bits 169 at the end of a repetition period of the MTC-PDCICH transmission and its network assigned RNTI as inputs to detect an MTC-CCI or MTC-CCIs intended for the MTC device. As discussed earlier, depending on device state and mode, SI-RNTI, P-RNTI, RA-RNTI, temporary C-RNTI or C-RNTI can be used.

The MTC-CCI detection module 170 comprises an MTC-PDCICH extraction module 171, a de-ratematching module 173, a normalizing module 174, a device specific mask generating module 175, a device specific unmasking module 176, a plurality of correlation modules 177, a max correlation module 178, and a detection module 179.

For each MTC-PDCICH candidate m=0, 1 in USS/CSS, the MTC-PDCICH extraction module 171 extracts 576 soft bits of the candidate as follows.

Let s be the sequence of USS/CSS accumulated soft bits 169 and $v^m$ be the sequence of 576 extracted MTC-PDCICH soft bits of candidate m.

$$v^m(i)=s(576m+i); i=0,1,\ldots,575$$

The 576 extracted MTC-PDCICH soft bits 172 are then processed by other modules to detect MTC-CCI intended for the MTC-UE.

The de-ratematching module 173 performs de-ratematching on the 576 extracted MTC-PDCICH soft bits 172 to output 72 MTC-PDCICH soft bits.

The normalizing unit module 174 normalizes the sequence of 72 MTC-PDCICH soft bits by applying the following normalization method.

Let d be the sequence of 72 MTC-PDCICH soft bits, and e be the sequence of 72 normalized MTC-PDCICH soft bits $$e_k = \frac{72 \times d_k}{\sum_{j=0}^{71} |d_j|}, \quad k=0, 1, \ldots, 71$$

The device specific mask generating module 175 generates a 72-bit device specific mask from network assigned 16-bit RNTI input. The process is the same as the corresponding device specific mask generating function module 363, discussed above.

The device specific unmasking functional module 176 performs unmasking to generate an unmasked MTC-PDCICH soft bits by applying the following method:

Let m be the 72-bit device specific mask sequence, e be the sequence of 72 normalized MTC-CCI soft bits, and $\tilde{e}$ be the 72 unmasked MTC-PDCICH soft bits $$\tilde{e}_k = \begin{cases} e_k & \text{if } m_k = 0 \\ -e_k & \text{if } m_k = 1 \end{cases}, k = 0, 1, \ldots, 71$$

The plurality of correlation modules comprise four correlation modules 177 which calculate four correlations between the unmasked MTC-PDCICH soft bits ($\tilde{e}$) and four sequences of modulated bits of the four possible MTC-CCI code words specified in Table 1 as follows.

Let $c^{(i)}$ be the 72-bit code word i specified in Table 1, i=0, 1, 2, 3 (MTC-CCI) and $r^{(i)}$ be the correlation between $\tilde{e}$ and $c^{(i)}$ $$r^{(i)} = \sum_{k=0}^{71} (\tilde{e}_k \times (-2.0 \times c_k^i + 1))$$

The max correlation module 178 find the maximum value ($r_{max}$) among the four correlation $r^{(i)}$ and the corresponding index ($i_{max}$) of the maximum value, $$r_{max} = \max(r^{(0)}, r^{(1)}, r^{(2)}, r^{(3)})$$

$$i_{max} = \underset{i}{\mathrm{argmax}}(r^{(i)})$$

The detection module 179 compares the maximum correlation $r_{max}$ with a predefined threshold T to detect MTC-CCI as follows.

If $r_{max} \geq T$:

MTC-CCI=$i_{max}$

Else:

No MTC-CCI is detected

Figure 11:
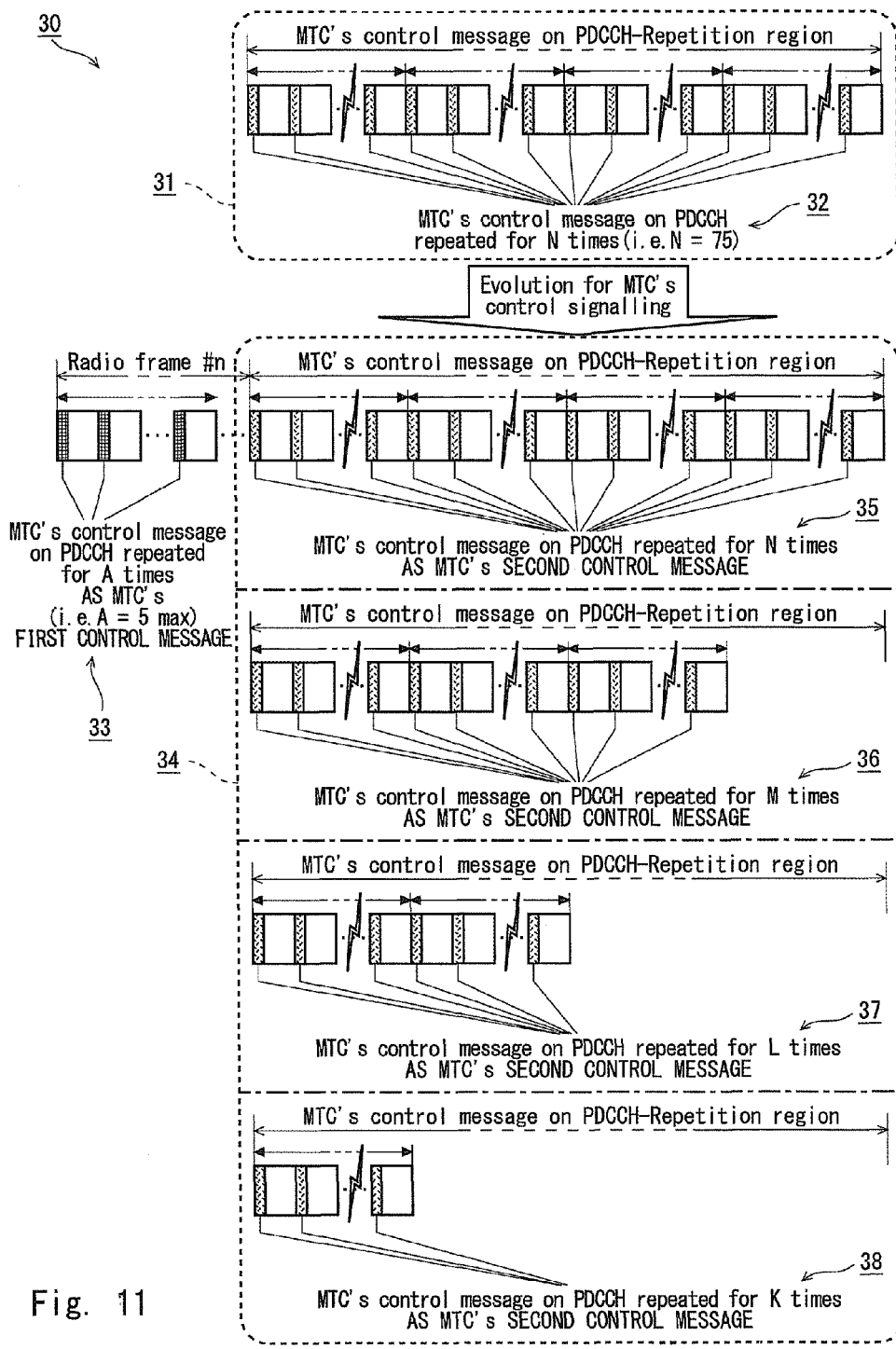
FIG. 11 illustrates four levels of control message repetition, according to an embodiment of the present invention.

FIG. 11 illustrates four levels of control message repetition, according to an embodiment of the present invention.

A first level of control message repetition 35 illustrates maximum coverage enhancement, where a control message is repeated N times (e.g. N=75) on the PDCCH as a second control message. A second level of control message repetition 36 illustrates coverage enhancement where a control message is repeated M times (M<N) on the PDCCH as a second control message. A third level of control message repetition 37 illustrates coverage enhancement where a control message is repeated L times (L<M) on the PDCCH as a second control message. A fourth level of control message repetition 38 illustrates coverage enhancement where a control message is repeated K times (K<L) on the PDCCH as a second control message.

Performance Evaluations

Simulations of MTC-CCI detection have been carried out to evaluate a performance of embodiments of the present invention with the setup illustrated in Table 2.

TABLE 2

Simulation setup

| Parameter | Value |
| --- | --- |
| Number of Tx antennas | 2 |
| Number of Rx antennas | 1 |
| Channel estimation (Real/Ideal) | Ideal |
| Number of Resource Blocks | 50 |
| Number of repetitions for MTC-PDCICH transmission | 5 |
| Propagation channel condition | EPA |
| Doppler frequency | 1 Hz |
| Aggregation level for MTC-PDCICH | 8 CCEs |
| RNTI used at eNodeB side/MTC device side (for Pmiss measurement) | 0xAAAA |
| RNTI used in MTC device side for Pfalse1 measurement | 0x12AA |

Figure 12:
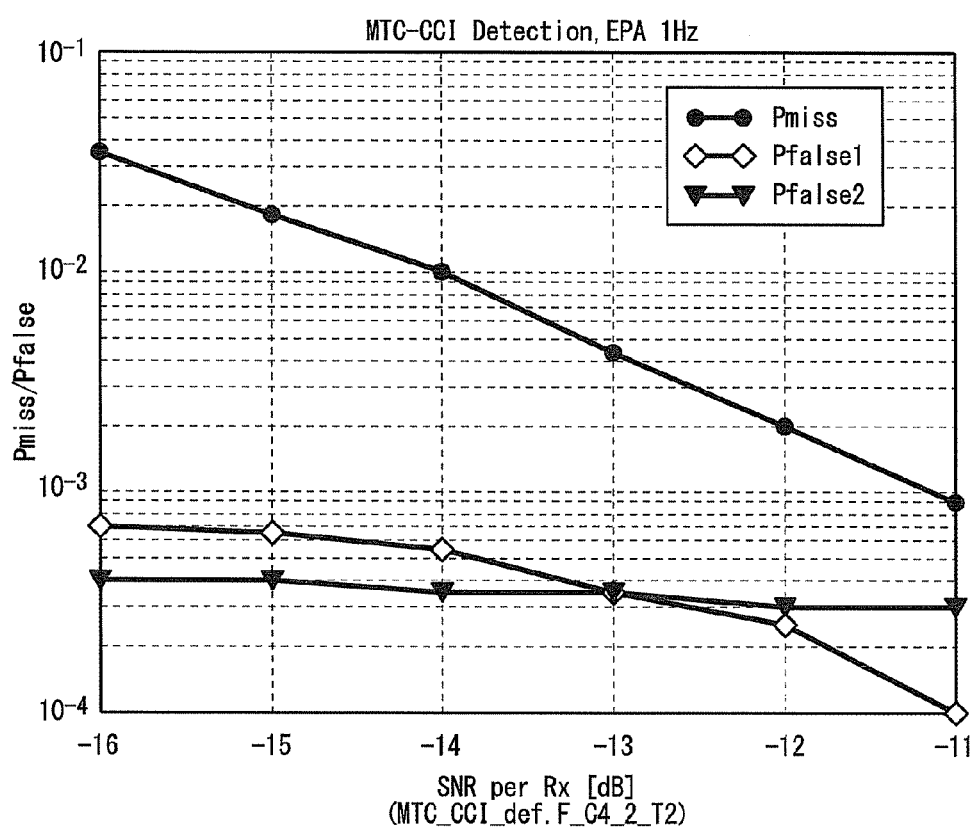
FIG. 12 illustrates simulation results according to an embodiment of the present invention.

FIG. 12 illustrates simulation results according to the above simulation setup.

Pmiss illustrates a probability of miss detection which is defined as a case when MTC-CCI is transmitted, and the MTC device fails to detect it. This will result in retransmission of MTC-CCI, MTC PDCCH and MTC PDSCH at base station in the next MTC PDCCH repetition interval. This does not have any impact on MTC-UE. This may enhance MTC device performance in term of power conservation as under a channel condition that an MTC device fails to detect MTC-CCI intended for it, it would fail to decode the associated MTC-PDCCH and MTC-PDSCH. Stopping to process the associated MTC-PDCCH and MTC-PDSCH shall help MTC-UE to conserve its power. The RNTI used in the simulation was 0xAAAA.

Pfalse1 illustrates a probability of false detection type 1 which is defined as a case when MTC-CCI is transmitted for another MTC device but the MTC device wrongly detects it. This results in an MTC device attempt in processing associated MTC-PDCCH and throws the result away. Aiming to keep this as low as possible. In the simulation, the RNTI at eNodeB was set to 0xAAAA and the RNTI used in the MTC device was set to 0x12AA.

Pfalse2 illustrates a probability of false detection type 2 which is defined as a case when no MTC-CCI is transmitted but the MTC device wrongly detects an MTC-CCI. This results in an MTC device attempt in processing associated MTC-PDCCH and throws the result away. Aiming to keep this as low as possible.

The simulation results demonstrate that the invention provides a reliable method for transmitting control information to the low cost & enhanced coverage MTC device and for detecting MTC-CCI. The rate of successful detection is very high (99% at SNR of −14 dB) and the rate of false detection is very low (less than 0.075%).

In the present specification and claims (if any), the word "comprising" and its derivatives including "comprises" and "comprise" include each of the stated integers but does not exclude the inclusion of one or more further integers.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The whole or part of the exemplary embodiments disclosed above can be described as, but not limited to, the following supplementary notes.

(Supplementary Note 1)

A method for use in an advanced wireless communication network, the method including:

providing, to a radio device, a first control message on a first channel, the first control message indicating:

a presence of a second control message on a second channel; and a coverage enhancement configuration of the second control message; and providing, to the radio device, the second control message on the second channel according to the coverage enhancement configuration.

(Supplementary Note 2)

The method of Supplementary note 1, wherein the first control message enables the radio device to determine a presence of a second control message in order to be able to selectively process messages on the second channel.

(Supplementary Note 3)

The method of Supplementary note 1, wherein the coverage enhancement configuration defines a number of repetitions of the second control message in a repetition region.

(Supplementary Note 4)

The method of Supplementary note 1, wherein the first message is provided on a physical downlink control indicator channel.

(Supplementary Note 5)

The method of Supplementary note 1, wherein the second message is provided on a physical downlink control channel.

(Supplementary Note 6)

The method of Supplementary note 1, wherein the radio device comprises a Machine-Type Communication (MTC) device.

(Supplementary Note 7)

The method of Supplementary note 1, wherein the first message is provided multiplexed with other control messages in a control region, for blind detection by the radio device.

(Supplementary Note 8)

The method of Supplementary note 7 wherein, the first channel is processed with an aggregation level of 8 control channel elements (CCEs), multiplexed with other physical downlink control channels for other radio devices, and mapped within a control region for blind detection the radio device.

(Supplementary Note 9)

The method of Supplementary note 1, wherein the first control message includes 2-bit control channel indicator to indicate 2, 3 or 4 repetition levels of the associated second control message.

(Supplementary Note 10)

The method of Supplementary note 9, wherein the repetition levels correspond to different levels of coverage enhancement at the radio device.

(Supplementary Note 11)

The method of Supplementary note 9, further comprising encoding the 2-bit control channel indicator to produce a 72-bit codeword.

(Supplementary Note 12)

The method of Supplementary note 11, further comprising masking the 72-bit codeword with a 72-bit device specific mask, and rate-matching the masked 72-bit codeword to generate a 576 physical downlink control indicator channel bits.

(Supplementary Note 13)

The method of Supplementary note 12 wherein, the 72-bit device specific mask is generating by encoding a 16-bit RNTI with 1/3 convolutional coding.

(Supplementary Note 14)

The method of Supplementary note 13 wherein, the 16-bit RNTI comprises one of: a SI-RNTI, a P-RNTI, an RA-RNTI, a temporary C-RNTI, a C-RNTI or an MTC-RNTI.

(Supplementary Note 15)

The method of Supplementary note 9, wherein the 2-bit control channel indicator is encoded using the following coding table:

| MTC-CCI | MTC-CCI code word $<b_0, b_1, \ldots, b_{71}>$ |
|---|---|
| 0 | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |

(Supplementary Note 16)

The method in Supplementary note 1 further comprises providing, to the radio device, repetitions of the first message in a plurality of distinguishable control regions.

(Supplementary Note 17)

The method in Supplementary note 16 wherein, the number of repetitions of the first message is at least partly predefined.

(Supplementary Note 18)

The method in Supplementary note 16 wherein, plurality of distinguishable control regions comprise control regions of consecutive subframes within a radio frame immediately preceding the radio frame having the second control message.

(Supplementary Note 19)

The method in Supplementary note 16 wherein the number of repetitions of the first message is defined according to a control search space.

(Supplementary Note 20)

The method of Supplementary note 19, wherein the number of repetitions of the first message is 5 for a MTC-PDCICH in a common search space.

(Supplementary Note 21)

A base station for advanced wireless communication, the base station, including:
 a transmitter;
 a processor coupled to the transmitter;
 a memory coupled to the processor, the memory including instruction code executable by the processor for:
  providing, by the transmitter to a radio device, a first control message on a first channel, the first control message indicating: a presence of a second control message on a second channel; and a coverage enhancement configuration of the second control message; and
  providing, by the transmitter to the radio device, the second control message on the second channel according to the coverage enhancement configuration.

(Supplementary Note 22)

A system for advanced wireless communication, the system, including:
 a radio device; and
 a base station, the base station including:
 a transmitter;
 a processor coupled to the transmitter;
 a memory coupled to the processor, the memory including instruction code executable by the processor for:
  providing, by the transmitter to the radio device, a first control message on a first channel, the first control message indicating: a presence of a second control message on a second channel; and a coverage enhancement configuration of the second control message; and
  providing, by the transmitter to the radio device, the second control message on the second channel according to the coverage enhancement configuration;
 wherein the first control message enables the radio device to determine a presence of a second control message in order to be able to selectively process messages on the second channel.

This application is based upon and claims the benefit of priority from Australian provisional patent application No. 2014900141, filed on Jan. 17, 2014, the disclosure of which is incorporated herein in its entirety by reference.

REFERENCE SIGNS LIST

10 COMMUNICATION NETWORK
20 COMMUNICATION SYSTEM
41 MTC-PDCICH
42 ASSOCIATED MTC-PDCCH
43 FIRST SUBFRAME
100 MTC DEVICE
105, 305 ANTENNA
110, 310 RF UNIT
120, 320 DIGITAL TO ANALOGUE CONVERTER
130 BASEBAND PROCESSOR
150 APPLICATION PROCESSOR
152, 352 MTC-PDCCH PROCESSING UNIT
170, 360 MTC-CCI PROCESSING UNIT (MODULE)
160, 370 MTC-PDCICH PROCESSING UNIT (MODULE)
161 PDCCH/MTC-PDCICH SYMBOL
162 DEMODULATION MODULE
163 PDCCH/MTC-PDCICH SOFT BIT
164 DEINTERLEAVING AND CYCLIC SHIFTING MODULE

165 DESCRAMBLING MODULE
166 DESCRAMBLED PDCCH/MTC-PDCICH SOFT BIT
167 USS/CSS EXTRACTION MODULE
168 USS/CSS ACCUMULATION MODULE
169 USS/CSS ACCUMULATED SOFT BIT
171 MTC-PDCICH EXTRACTION MODULE
172 EXTRACTED MTC-PDCICH SOFT BIT
173 DE-RATEMATCHING MODULE
174 NORMALIZING MODULE
175 UE SPECIFIC MASK GENERATING MODULE
176 UE SPECIFIC UNMASKING MODULE
177 CORRELATION MODULE
178 MAX CORRELATION MODULE
179 DETECTION MODULE
200 LTE UE (DEVICE)
300 eNB (LTE BASE STATION)
350 BASEBAND PROCESSING UNIT
361 MTC-CCI ENCODING MODULE
362 MTC-CCI CODE WORD
363 UE SPECIFIC MASK GENERATING MODULE
364 UE SPECIFIC MASK
365 UE SPECIFIC MASKING MODULE
366 MASKED MTC-CCI CODE WORD
367 RATE MATCHING MODULE
368 MTC-PDCICH
370 MTC-PDCICH PROCESSING MODULE
371 PDCCH
372 CCE AGGREGATION AND MTC-PDCICH/PDCCH MULTIPLEXING MODULE
373 SCRAMBLING MODULE
374 QPSK MODULATION MODULE
375 LAYER MAPPING & PRECODING MODULE
376 REG LEVEL INTERLEAVING MODULE
377 REG LEVEL CELL SPECIFIC CYCLIC SHIFTING MODULE
378 RE MAPPING MODULE
400 AIR INTERFACE
500 LTE CORE NETWORK
550 INTERNAL MTC SERVER
600 EXTERNAL MTC SERVER
700 MTC APPLICATION SERVER
800 EXTERNAL IP NETWORK

The invention claimed is:

1. A method implemented in a base station used in a wireless communication network, the method including:
providing, to a radio device, a first control message on a first channel, the first control message indicating:
a presence of a second control message on a second channel; and
a coverage enhancement configuration of the second control message; and
providing, to the radio device, the second control message on the second channel according to the coverage enhancement configuration,
wherein the first control message includes a 2-bit control channel indicator to indicate 2, 3, or 4 repetition levels of the associated second control message and wherein the repetition levels correspond to different levels of coverage enhancement at the radio device.

2. The method of claim 1, wherein the first control message enables the radio device to determine a presence of a second control message in order to be able to selectively process messages on the second channel.

3. The method of claim 1, wherein the coverage enhancement configuration defines a number of repetitions of the second control message in a repetition region.

4. The method of claim 1, wherein the first message is provided on a physical downlink control indicator channel.

5. The method of claim 1, wherein the second message is provided on a physical downlink control channel.

6. The method of claim 1, wherein the radio device comprises a Machine-Type Communication (MTC) device.

7. The method of claim 1, wherein the first message is provided multiplexed with other control messages in a control region, for blind detection by the radio device.

8. The method of claim 7 wherein, the first channel is processed with an aggregation level of 8 control channel elements (CCEs), multiplexed with other physical downlink control channels for other radio devices, and mapped within a control region for blind detection the radio device.

9. The method in claim 1 further comprises providing, to the radio device, repetitions of the first message in a plurality of distinguishable control regions.

10. The method in claim 9 wherein, the number of repetitions of the first message is at least partly predefined.

11. The method in claim 9 wherein, plurality of distinguishable control regions comprise control regions of consecutive subframes within a radio frame immediately preceding the radio frame having the second control message.

12. The method in claim 9 wherein the number of repetitions of the first message is defined according to a control search space.

13. A method implemented in a base station used in a wireless communication network, the method including:
providing, to a radio device, a first control message on a first channel, wherein the first control message includes a 2-bit control channel indicator to indicate 2, 3, or 4 repetition levels of the associated second control message, the first control message indicating:
a presence of a second control message on a second channel; and
a coverage enhancement configuration of the second control message;
encoding the 2-bit control channel indicator to produce a 72-bit codeword; and
providing, to the radio device, the second control message on the second channel according to the coverage enhancement configuration.

14. The method of claim 13, further comprising masking the 72-bit codeword with a 72-bit device specific mask, and rate-matching the masked 72-bit codeword to generate a 576 physical downlink control indicator channel bits.

15. The method of claim 14 wherein, the 72-bit device specific mask is generating by encoding a 16-bit RNTI with 1/3 convolutional coding.

16. The method of claim 15 wherein, the 16-bit RNTI comprises one of: a SI-RNTI, a P-RNTI, an RA-RNTI, a temporary C-RNTI, a C-RNTI or an MTC-RNTI.

17. A method implemented in a base station used in a wireless communication network, the method including:
providing, to a radio device, a first control message on a first channel, wherein the first control message includes a 2-bit control channel indicator to indicate 2, 3, or 4 repetition levels of the associated second control message, the first control message indicating:
a presence of a second control message on a second channel; and
a coverage enhancement configuration of the second control message; and
providing, to the radio device, the second control message on the second channel according to the coverage enhancement configuration, wherein the 2-bit control channel indicator is encoded using the following coding table:

| MTC-CCI | MTC-CCI code word $<b_0, b_1, \ldots, b_{71}>$ |
|---|---|
| 0 | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0>. | the repetition levels correspond to different levels of coverage enhancement at the radio device.

18. A method implemented in a base station used in a wireless communication network, the method including:
providing, to a radio device, a first control message on a first channel, the first control message indicating:
a presence of a second control message on a second channel; and
a coverage enhancement configuration of the second control message; and
providing, to the radio device, the second control message on the second channel according to the coverage enhancement configuration,
providing, to the radio device, repetitions of the first message in a plurality of distinguishable control regions,
wherein the number of repetitions of the first message is defined according to a control search space, and
wherein the number of repetitions of the first message is 5 for a MTC-PDCICH in a common search space.

19. A method implemented in a radio device used in a wireless communication network, the method including:
receiving, from a base station, a first control message on a first channel, the first control message indicating:
a presence of a second control message on a second channel; and
a coverage enhancement configuration of the second control message; and
receiving, from the radio device, the second control message on the second channel according to the coverage enhancement configuration,
wherein the first control message includes a 2-bit control channel indicator to indicate 2, 3, or 4 repetition levels of the associated second control message and wherein the repetition levels correspond to different levels of coverage enhancement at the radio device.

20. A method implemented in a wireless communication network, the method including:
providing, from a base station to a radio device, a first control message on a first channel, the first control message indicating:
a presence of a second control message on a second channel; and
a coverage enhancement configuration of the second control message; and
providing, from the base station to the radio device, the second control message on the second channel according to the coverage enhancement configuration,
wherein the first control message includes a 2-bit control channel indicator to indicate 2, 3, or 4 repetition levels of the associated second control message and wherein 21. A base station used in a wireless communication network, the base station including:
a first transmitter to transmit, to a radio device, a first control message on a first channel, the first control message indicating:
a presence of a second control message on a second channel; and
a coverage enhancement configuration of the second control message; and
a second transmitter to transmit, to the radio device, the second control message on the second channel according to the coverage enhancement configuration,
wherein the first control message includes a 2-bit control channel indicator to indicate 2, 3, or 4 repetition levels of the associated second control message and wherein the repetition levels correspond to different levels of coverage enhancement at the radio device.

22. A radio device used in a wireless communication network, the radio device including:
a first receiver to receive, from a base station, a first control message on a first channel, the first control message indicating:
a presence of a second control message on a second channel; and
a coverage enhancement configuration of the second control message; and
a second receiver to receive, from the base station, the second control message on the second channel according to the coverage enhancement configuration,
wherein the first control message includes a 2-bit control channel indicator to indicate 2, 3, or 4 repetition levels of the associated second control message and wherein the repetition levels correspond to different levels of coverage enhancement at the radio device.

23. A wireless communication network including:
a radio device; and
a base station
to provide, to the radio device, a first control message on a first channel, the first control message indicating:
a presence of a second control message on a second channel; and
a coverage enhancement configuration of the second control message, and
to provide, to the radio device, the second control message on the second channel according to the coverage enhancement configuration,
wherein the first control message includes a 2-bit control channel indicator to indicate 2, 3, or 4 repetition levels of the associated second control message and wherein the repetition levels correspond to different levels of coverage enhancement at the radio device.

* * * * *